Patented June 23, 1931

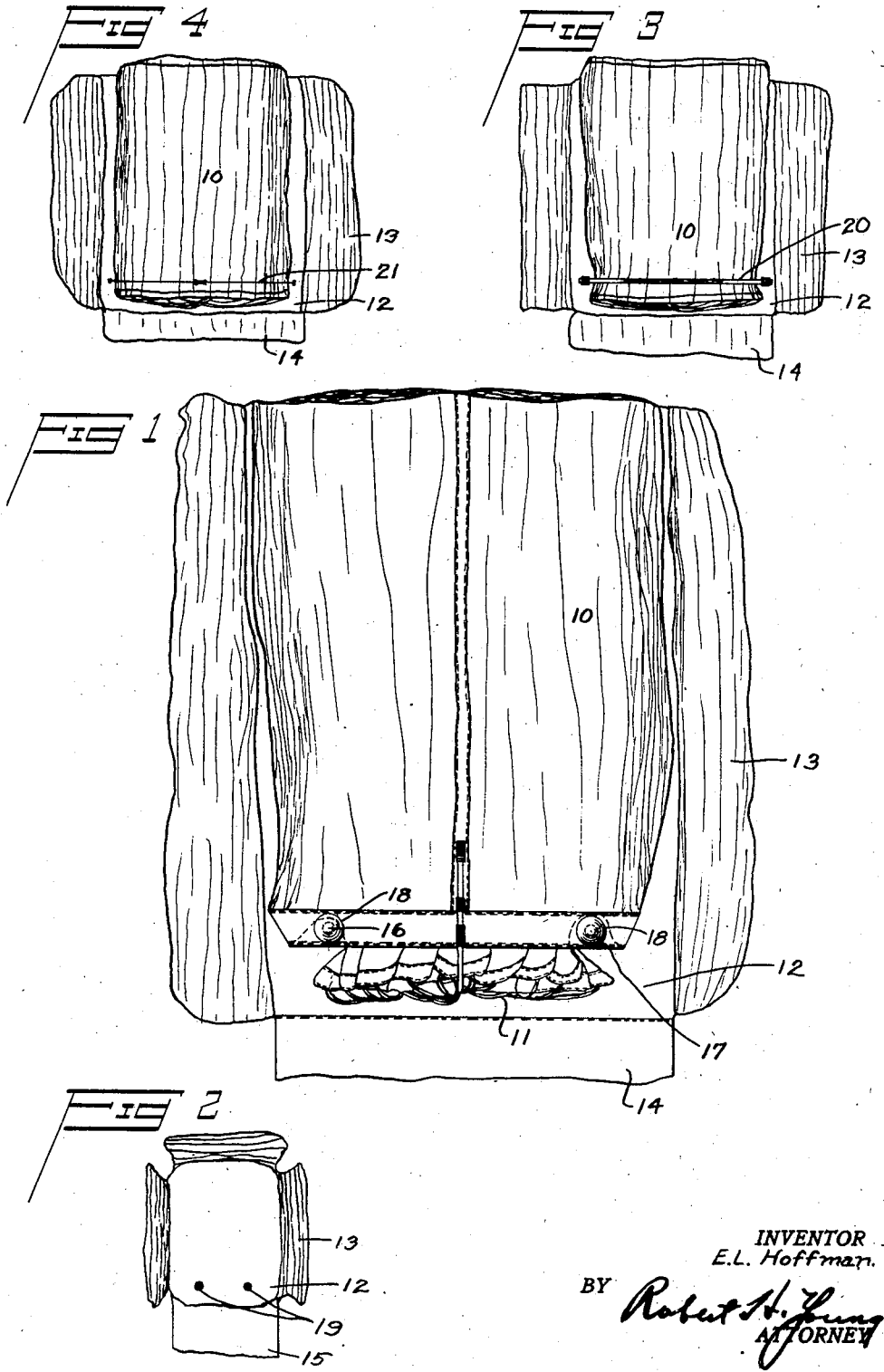

1,811,050

UNITED STATES PATENT OFFICE

EDWARD L. HOFFMAN, OF DAYTON, OHIO

PARACHUTE SKIRT DELAYER

Application filed September 6, 1929. Serial No. 390,816.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The present invention relates generally to improvements in parachutes and more particularly to parachutes wherein the improvements are directed toward providing a novel and dependable means for effecting the straightening out and opening of the parachute under all conditions, especially those types of parachutes which are packed in containers. To insure of the certain and prompt opening of the parachute and avoid the danger of fouling of the canopy, it is necessary that it be released from its container in an orderly sequence of its component parts.

In conventional parachutes of present day construction, the usual method of packing the parachute in the container is such that in emerging from the container either the top of the main supporting parachute is arranged to emerge first followed in order by the canopy and suspension lines or, in older practice, the manner of packing was of such arrangement that the suspension lines emerged first followed in order by the bottom of the canopy and then the top of the supporting parachute. In either case, it has been found by experiment that parachutes of the foregoing type have been uncertain in their action and unreliable, the suspension lines often becoming afoul of the canopy; thus strangling the parachute and preventing it from opening.

This invention, therefore, has as its main object the correction of the various faults inherent in parachutes of present day type in order that the parachute may offer a reasonably dependable means of safety in case of accident to an aircraft.

A feature of my invention which overcomes the above mentioned difficulties is the provision of simple yet adequate means for restraining the skirt of the parachute as well as the suspension lines below it from leaving the pack until pulled out by the combined force of the pilot parachute and whip of the main canopy.

It will be apparent from the above named objects that the general purpose of the invention is the achievement of a high degree of safety in apparatus of the class described.

My invention possesses other objects and advantages, some of which with the foregoing will be set forth in the following detailed description. It is to be understood that I do not wish to be limited to the precise showing made but desire to avail myself of variant forms of the construction set forth as come within the scope of the appended claims. In the drawings Fig. 1 is a plan view of a parachute and container therefor embodying one form of my invention.

Fig. 2 is a plan view of the container showing the location of the fastening means for the skirt.

Fig. 3 is a modified form of the invention in which elastic means are used to delay the skirt in the container.

Fig. 4 is a still further modification in which light-weight cord is utilized as the delaying means.

Referring more particularly to the drawings in which corresponding numerals designate like parts in the various figures, the parachute canopy in the embodiment of the invention herein illustrated consists of a sustaining portion 10 having attached thereto the usual suspension lines 11. A parachute pack 12 of conventional design having side flaps 13 and end flap 14 is provided which, when folded over the back portion 15, retains the folded parachute therein. The foregoing provisions are, for the most part, in general use and are referred to as incidental to the details to be referred to hereinafter.

To insure of the skirt of the parachute remaining in the pack until the parachute is extended, delaying means as shown at 16 and 17 are provided which in the present instance comprise snap fasteners of conventional design, the female portions 18 of which are attached to the skirt of the parachute in spaced relation which cooperate with male portions 19 secured to the back portion 15 of the parachute. When the parachute is in a folded position and placed upon the pack prior to packing, the fasteners are snapped together which in effect retains the skirt in the pack until the required pull causes the snap fasteners to separate and thus free the skirt. The skirt of the canopy being thus held to the pack, the parachute is folded in the pack in the usual manner, and the side and end flaps folded and secured in place.

In normal operation, the top of the parachute canopy emerges first from the container. When the flaps of the pack are released by the pull exerted by the rip cord and the canopy pulled out until the skirt portion of the canopy is drawn tight against the delaying means heretofore described, caused either by the pull of the pilot chute or whip of the canopy as the case may be. When sufficient pull is exerted against the fasteners, they are forced apart or separated thus allowing the skirt and suspension lines to be withdrawn.

In this manner a sequence of operation of the various parts of the parachute in leaving the pack is obtained whereby the hazard of the suspension lines becoming fouled in the canopy is avoided.

Fig. 3 shows another form of the invention in which the delaying means is in the form of a resilient band of elastic cord 20 which is sewed or otherwise secured to the back portion of the pack in a manner such that the skirt of the parachute canopy when in a folded condition will be held in the pack until the parachute is pulled out by the force of the pilot chute exerted thereon.

Fig. 4 shows a still further modification of the invention, in this case a frangible cord 21 having a predetermined breaking strength being used which is attached to the pack on both sides of the parachute, the skirt of the parachute being tied in place until such time as the pull of the pilot chute will break the cord and permit the parachute and suspension lines to leave the pack.

Having thus described my invention what I claim as new and desire to secure by Letters Patent is:—

1. The combination with a parachute and a container therefor of means for retaining the skirt portion only of the parachute fixed relative to said container until forcibly withdrawn therefrom.

2. In a parachute pack a parachute to be folded in said pack and having suspension elements attached to the rim portion thereof, and means for yieldably retaining said rim portion in folded fixed relation to said pack until said rim portion is forcibly withdrawn from said pack.

3. The combination with a parachute pack attached to hold a folded parachute therein, of releasable means for yieldably holding the folds of the skirt of said parachute in fixed relation to said pack until the canopy of said parachute is in an extended position.

4. In a parachute pack a parachute folded in said pack comprising a parachute canopy and means for retaining the rim portion secured to said pack during the release of said parachute therefrom, said means comprising separable devices attached to said rim portion and pack respectively.

In testimony whereof I affix my signature.
EDWARD L. HOFFMAN.